United States Patent [19]

Sammueller

[11] Patent Number: 4,645,292
[45] Date of Patent: Feb. 24, 1987

[54] DEVICE FOR FACILITATING CONNECTING LIGHT WAVEGUIDES IN A CONNECTOR FOR A MULTIPLE LIGHT WAVEGUIDE

[75] Inventor: Rudolf Sammueller, Munich, Fed. Rep. of Germany

[73] Assignee: Siemens Aktiengesellschaft, Berlin and Munich, Fed. Rep. of Germany

[21] Appl. No.: 634,473

[22] Filed: Jul. 24, 1984

[51] Int. Cl.⁴ .................................................. G02B 6/36
[52] U.S. Cl. ................................ 350/96.20; 350/96.21
[58] Field of Search ........................... 350/96.20, 96.21

[56] References Cited

U.S. PATENT DOCUMENTS

| | | | |
|---|---|---|---|
| 4,146,301 | 3/1979 | Cherin et al. | 350/96.21 |
| 4,183,616 | 1/1980 | Benoit et al. | 350/96.20 |
| 4,213,671 | 7/1980 | Lambert | 350/96.21 |
| 4,276,113 | 6/1981 | Carlsen et al. | 350/96.21 X |
| 4,385,801 | 5/1983 | Bubanko | 350/96.21 |

Primary Examiner—William L. Sikes
Assistant Examiner—Akm E. Ullah
Attorney, Agent, or Firm—Hill, Van Santen, Steadman & Simpson

[57] ABSTRACT

A device to facilitate the connection of a plurality of light waveguides to a connector for a plurality of light waveguides characterized by a pair of spaced comb systems having teeth members spaced apart for receiving the waveguides and positioning them in centering grooves of a connector element. The comb systems are arranged with the spaces of one system being aligned with the spaces of the other system and aligned with the grooves of the connector element. Preferably, the spaces of one system are matched to the diameter of stripped ends of the waveguide while the other system has spaces which are matched to the diameter of the cladded waveguide. Preferably, the device for holding the connector is on an interchangeable plate and the device includes means for positioning the interchangeable plate after positioning of the waveguides to enable curing an adhesive holding the waveguides in the connector.

29 Claims, 4 Drawing Figures

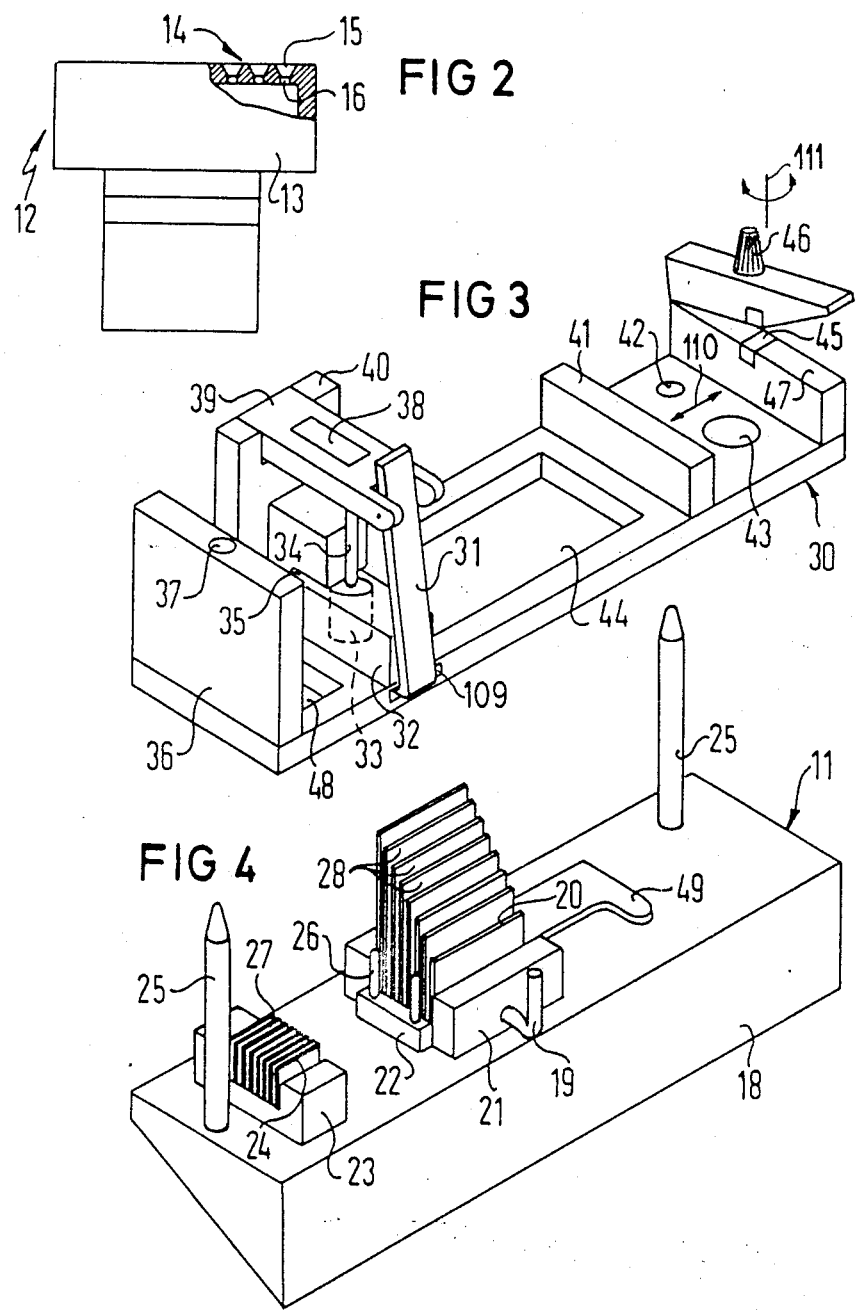

DEVICE FOR FACILITATING CONNECTING LIGHT WAVEGUIDES IN A CONNECTOR FOR A MULTIPLE LIGHT WAVEGUIDE

BACKGROUND OF THE INVENTION

The present invention is directed to a device or apparatus to facilitate assembly of a connector for a plurality of waveguides such as fiber waveguides with a plurality of waveguides, said device or apparatus including a first part for positioning the stripped ends of the individual waveguides, a second part for positioning the light waveguides which are cladded with a protective layer, a third part for securing or fixing the waveguides to be connected and an arrangement to position the connector relative to the first and second parts.

An adjustment apparatus for positioning light waveguides in the production of non-releasable splice connections is disclosed in German Pat. No. 29 32 723 which shows parts which are provided for positioning the light waveguides with and without cladding. The fixing device for the light waveguides without cladding are designed as V-shaped positioning grooves in which the light waveguides are laid in a centering fashion and clamped. Since a plurality of the light waveguides are also simultaneously disposed one behind another, the centering grooves must be very precisely designed and further the mounting or, respectively, the introduction of light waveguides into the centering groove is not all that simple. A preadjustment already occurs by means of inserting the light waveguides with a cladding into correspondingly larger grooves. However, this introduction is difficult particularly given the plurality of light waveguides since the positioning of the individual light waveguides cannot be undertaken until all the light waveguides have been inserted. This is a matter of non-releasable splice connections but similar means are also known for releasable splice connections, for example, as disclosed in German Pat. No. 25 18 319. However, the splice connection arrangement in this case is also to be viewed as an assembly facility at the same time so that such splice connections are very costly.

SUMMARY OF THE INVENTION

The present invention is directed to providing a device or an apparatus to facilitate the assembly of individual light waveguides such as fibers with a connector which device has means for positioning the individual light waveguides of a bundle or, respectively, a plurality of light waveguides in as simple as possible a manner and includes enabling an intermediate centering and fixing to occur as the result of positioning the individual light waveguides.

The above objects are obtained by an improvement in apparatus for facilitating the assembly of a connector for a plurality of waveguides with a plurality of waveguides such as optical fibers. This apparatus includes first means for positioning the stripped ends of the individual waveguides, second means for positioning each of the light waveguides which are cladded with a protection layer, third means for fixing or securing the waveguides to be connected and means for locating the connector. The improvement comprises the first means being a first comb system having a plurality of first teeth members with spaces therebetween, said second means being a second comb system with a plurality of second teeth members with spaces therebetween, the spaces of the first comb system being matched to the diameter of the stripped waveguides, the spaces of the second comb system being matched to the diameter of the cladded waveguides and being aligned to the spaces of the first comb system, said means for locating including means for supporting a connector element with a covering between the first and second comb systems with centering grooves of the connector element being aligned with the spaces of the comb systems, said means for locating including a clamping means for holding a cover element on the connector when the waveguides are positioned in the centering grooves and said third means including a universally shared receptacle for all of the light waveguides.

The apparatus or device of the present invention is particularly suited for the production of multiple connectors wherein each cable or, respectively, bundle end, is provided with a terminating part which is a multiple connector that is used after fabrication as either a non-releasable or releasable connecting unit. The device is thus particularly suited for the assembly of waveguides with a silicon multiple connector wherein the light waveguides are introduced and fixed in etched centering grooves of a silicon member. The device, however, is not restricted to the production of silicon multiple connectors. In principle, the individual comb system and the locating means of the apparatus can be fixed in a fixed disposition. A particularly advantageous embodiment of the device occurs, however, when the locating means are separated from the costly comb system so that a further connecting unit can be adjusted in the comb system during intervals which are required for the curing of an adhesive that holds the fibers on the connector part. The device of the present invention also encompasses all tools and devices that are required for the production of multiple connectors.

In the preferred embodiments, each of the comb systems has a plurality of planar plates, sheets or lamellae which form the teeth members that are spaced apart with the desired spacing. Preferably, the sheet or plate members of the first comb system all have the same height whereas the sheet or plates of the second comb system have different heights which are positioned one behind another according to an increasing height to form a stairstep configuration. It is also desirable for the comb systems to be mounted on a surface which is inclined or sloped from adjacent the operator away from the operator.

In the preferred embodiment, the third means for clamping is designed as a clamping apparatus having elastic inserts and may be displaceable in a longitudinal direction or may be rotatable around an axis. The preferred embodiment of the application preferably has means for stripping the lacquer layer from the device which includes a chamber having a lid with funnel-shaped bores through which the waveguides extend into the chamber which contains a chemical agent selected from a group consisting of chemical solvents and swelling agents. The lacquer will swell due to the agent and when the waveguides are removed from the bores the lacquer will be stripped therefrom.

To hold the connector element, a bearing block is positioned between the two comb systems, preferably on a separate member or plate that has apertures to allow the comb system to extend therethrough. The bearing block will include a slot for seating the element and the clamping means will resiliently hold the covering element on the connector element resting on the bearing block. In addition, the bearing block preferably includes a heating arrangement to cure the adhesive or the covering element after removal of the separate elements from the support for the comb systems. The device also includes positions having electrical connectors which engage contacts on the removable part to energize the heating elements to enable curing to occur and to free the comb systems to cooperate with an additional removable part to make another connection.

BRIEF DESCRIPTION OF THE DRAWINGS

FIG. 2 is a side view with portions broken away for purposes of illustration of a device for stripping cladding from the ends of the light waveguides;

FIG. 3 is a perspective view of a removable plate of the device of the present invention having a clamping arrangement for a multiple connector and also a holding arrangement for the light waveguides;

FIG. 4 is a fixed member of the device of the present invention which has comb systems and cooperates with the removable plate of FIG. 3 to enable positioning waveguides in a connector during an assembly operation.

DESCRIPTION OF THE PREFERRED EMBODIMENTS

Figure 1:
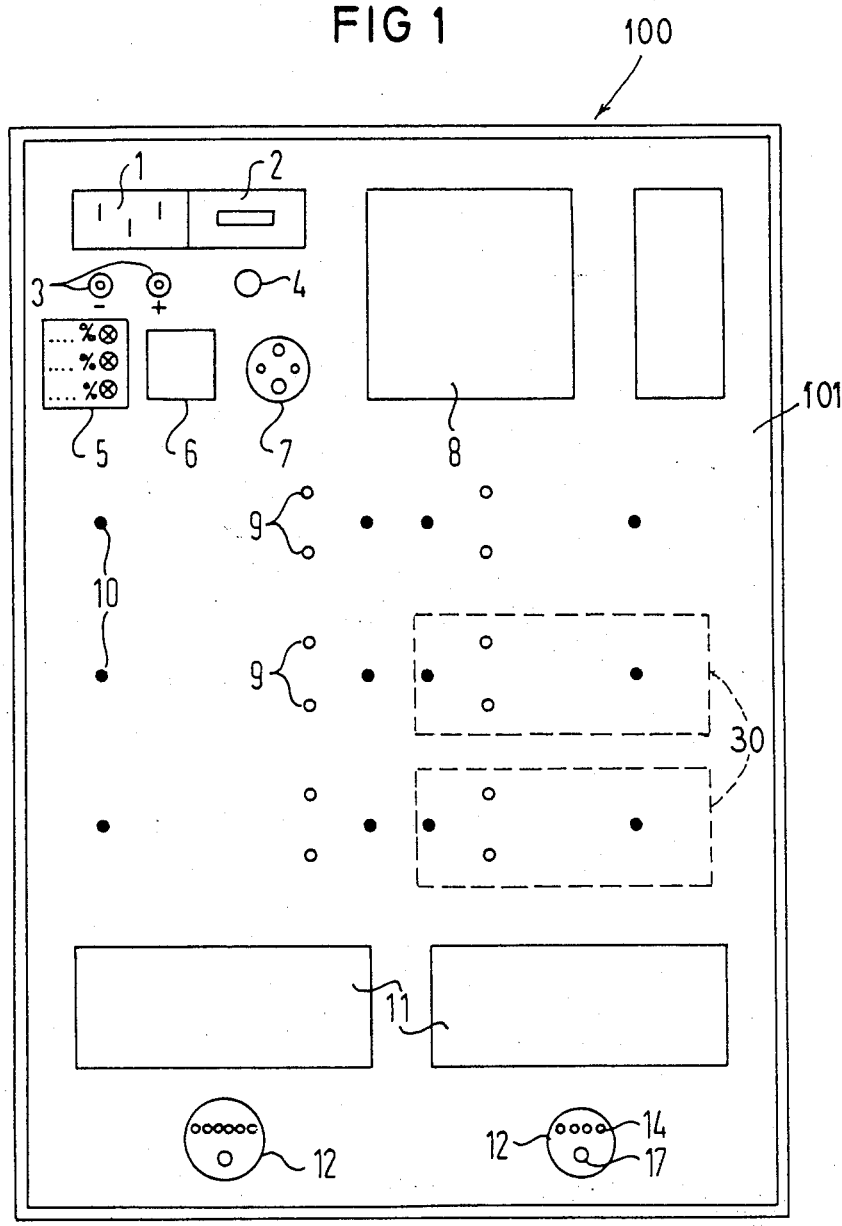
FIG. 1 is a plan view of the device of the present invention.

The principles of the present invention are particularly useful in the device or apparatus generally indicated at 100 which facilitates the assembly of a plurality of optical waveguides in a connector for a plurality of waveguides such as fibers. The device 100 has an appliance plate 101 with all the operating elements, auxiliary parts and the position for the actual processing devices. The arrangement of these parts is thereby selected so that a serviceable work sequence can be assumed.

The plate 101 in the upper left-hand corner has position 1 which receives a plug connection to a power source and position 2 which has the main fuse. In addition, external batteries can be connected by sockets 3 when desired. A rechargeable battery can be accommodated in the device 100 and a charging of the battery, which will occur during line power operations, will be indicated by means of a monitoring light 4. The charge of the battery is shown on an indicator 5 and the different power sources can be placed in operation by a power switch 6. In addition, if unfavorable lighting conditions exist, a work light can be connected at a connection 7. The device also includes an area for mounting a splicing seat or device at a position 8.

Positions 10 on the plate 101 are identified by guide pins which serve for positioning an interchangeable member or plate such as 30 shown in broken lines. These plates 30 are deposited here during a curing time. Six different interchangeable plates can be simultaneously deposited giving the arrangement of the present device since two guide pins are provided per interchangeable part 1. Outlets 9 serve for connection of heating elements which are disposed on the plates which apply heat to cure the connector while the interchangeable plate is in the position 10.

Positioned adjacent the operator are the actual assembly appliances or carriers 11, in which the laterally introduced light waveguide of the cables or, respectively, light waveguide bundles, are fixed and centered in the multiple connectors. Between each appliance 11 and the edge of the plate 101, a device 12 for stripping lacquer cladding from the ends of the waveguides is possible. As illustrated in FIG. 1, the plate 101 of the device 100 is a cover plate for a case. The cover plate 101 is preferably hinged to the case to permit access to the inside of the case which may contain additional devices or parts to aid in the assembly of the connectors. The device 100 due to this design is suitable for universal and non-location bound use. The receptacle parts in the form of multiple connectors with centering channels are required as connecting elements for light waveguides and the device 100 is particularly suited for the employment of silicon multiple connectors. Silicon multiple connectors consists of a silicon plate, member or lamella in which parallel centering channels have been etched. The multiple light waveguide connection can be very quickly and reliably executed with this device 100 since the inventive elements are positioned in an arrangement corresponding to the work sequence.

As mentioned hereinabove, lacquer stripping devices or means 12 are positioned adjacent the appliance or assembly elements 11. As best illustrated in FIG. 2, the lacquer stripping means consist of a cup-shaped part in which an appropriate liquid for dissolving or respectively swelling the lacquer cladding of the light waveguide is provided. This cup part is closed by a cover or lid 13 which has bores 14 into which the individual light waveguide ends that are to be stripped of the lacquer are introduced. In order to introduce the light waveguides more easily, the bores 14 are each provided with a funnel-like or diverging expansion 15 and terminate in small diameter bores having an inside sharp edge 16. As best seen in FIG. 1, the number of bores 14 in the cover 13 is the same as the number of light waveguides which are being connected to the multiple connector. An opening 17 is also provided in the lid or cover 13 so that a solvent or soaking agent can be introduced into the cup. The depth of this cup part corresponds exactly to the length of the light waveguide which is to have the cladding stripped therefrom so that a measurement otherwise required is eliminated. Methylene chloride is, for example, suitable as a soaking agent and will cause the lacquer on a light waveguide to swell, when the waveguide is introduced into the liquid or agent. After the soaking operation, the cladding will have become swollen and the light waveguides are withdrawn so that the cladding will be stripped off at the sharp inside edge 16 of the bore 14. Given production of multiple connectors, for example, twelve light waveguides, thus, a stripping cover 13 has twelve precision bores whose diameters correspond to the diameter of the light waveguide employed in being utilized. Thus, the lacquer cladding or protective layer will be simultaneously stripped from a portion of the end of each of the fibers or waveguides.

An exemplary embodiment according to the invention is the assembly appliance 11 which contains precision positioning parts on a carrier 18 and the locating parts which are on an interchangeable member or plate 30 (FIG. 3). In principle, however, the invention is really reflected by the exemplary embodiment having parts rigidly disposed relative to each other. The two exemplary embodiments differ only on the grounds of separability of the part or plate 30 from the part or plate 18. However, these two could be joined together if desired. In the arrangement illustrated in both FIGS. 3 and 4, the interaction between the part 18 of assembly appliance 11 and the interchangeable part 30 is visible after the latter has been lowered onto the part 18.

As illustrated in FIG. 4, the assembly 11 has a wedge-shaped base plate 18 which has a first part or means consisting of a first comb system 23, and spaced therefrom is a second part or means consisting of a second comb system 21. The comb system 23 is formed by a plurality of teeth members 24 which are formed of a plurality of sheets, plates or lamellae that are spaced apart to provide spaces 27 therebetween. In a similar manner, the second comb system 21 is provided by a plurality of spaced teeth members 28 which are spaced apart to provide spaces 20 therebetween. As illustrated, the members 24 all have the same height whereas the members 28 are of different heights and are arranged with one another according to increasing height so that a stairstep configuration is produced. On the base 18, a pair of guide pins 25 are provided and the base includes a latch 49 and a pair of alignment elements 22 and 26 which are displaceable by actuation of a toggle 19.

The removable plate 30 (FIG. 3) at one end is provided with a third part having clamping or fixing means which, as illustrated, is formed of a supporting bench 47 having a recess or receptacle 45 containing an elastic insert and a coacting clamping member 46 for applying pressure on a waveguide clamped therebetween. The means for fixing can be adjustable along the length of the plate 30 in the direction of the arrow 110, can be fixed permanently in position or can be mounted for rotation about an axis 111. The plate 30 at an end opposite the fixing means formed by the parts 45, 46 and 47 has a termination plate 36 which is provided with a guide bore 37 for receiving one of the guide pins 25. In a similar manner, a guide bore 42 receives the other pin. The plate 30, as illustrated, has two apertures or openings 44 and 48 which are positioned to enable receiving the first and second combs 23 and 21, respectively, and allow them to project above the surface of the plate. Disposed between the two apertures 44 and 48 is a means for locating a connector element of the multiple connection. As illustrated, this includes a bearing block 32, which is provided with a slot 35 for receiving the lamella or plate having the centering grooves which forms part of the multiple connector. In order to hold the connector in place with its cover element, a clamping arrangement or means which includes an upright element 40 supporting a second element 39 for pivotable movement. The second element 39 has a resilient or leaf-spring 38 which resiliently supports a pressure element 34. To hold the clamping arrangement in a clamping position, a bracket member 31 is connected to the second or upper member 39 and has a hook which is receivable in a slot 109 in the plate 30.

In operation, a plurality of waveguides or a bundle of waveguides first have the end of each of the individual waveguides inserted in the bores 14 of the lacquer stripping device 12 so that lacquer on the waveguides when exposed to the fluid will swell. Upon removal of the ends from the bores, the lacquer is stripped therefrom. The next step assumes that the plate 30 has been assembled on the assembly 11 having the pins 25 received in the guide bores 37 and 42. The bundle is received in the recess 45 and clamped when the desired end position has been determined. This can be easily arranged by extending the ends up to the terminal plate 36. Assuming that the ends have been stripped of the lacquer, the ends are to be mounted in the guide grooves of the multiple connector element. However, if the ends have not been stripped, this can be done with the bundle being clamped in the clamping means formed by the parts 45, 46 and 47.

After the ends have been clamped, the individual waveguides are then assembled into the comb systems 21 and 23, respectively. It should be noted that during this step the clamping means, which is formed by the parts 31, 34, 39 and 40, is in an open position to gain access to the grooves of the connector element. Also as noted, due to the engagement of the connector element by the alignment elements 26 and 22, the grooves of the connector element are aligned with the spaces between the sheets or lamella forming each of the comb means 21 and 23.

A special feature of the invention is that the comb systems 21 and 23 are utilized for centering and fixing the light waveguides. The first comb system 23 serves to receive the stripped portions of the light waveguides whereas the second comb system 21 serves for preadjusment of the cladded light waveguide having the lacquer coatings. Thus, the spaces 20 between the sheets 28 of the second system 21 correspond are are matched to the diameter of the cladded waveguide whereas the spaces 27 between the sheets or lamellae 24 match the diameter of the stripped waveguide. With the part 30 assembled on the assembly or base plate 18, the connector is positioned with its grooves aligned with the spaces of the two comb systems. As illustrated, the comb system 21 has the lamella 28 of the different heights and are arranged so that they are disposed one behind the other to form a stairstep configuration. This arrangement facilitates the introduction of the individual waveguides into the individual spaces 20 between adjacent lamellae. Given the arrangement according to the invention, the light waveguides are respectively pressed against the projecting faces of the next higher lamella 28. The corresponding slot or space, 20 is then found and the light waveguide is allowed to slide into the slot or space. Similarly, the end slides into the slot 27 between the lamellae 24. Since the height of the slots of the two comb systems 21 and 23 lies lower than the height of the grooves of the multiple connector element in relationship to a base surface, every light waveguide automatically proceeds into its designated centering groove of the connector. Another simplification of the manipulation occurs as a result of the upper surface of the base plate 18 being inclined downwardly from a point adjacent the operator toward the back. This slope as mentioned hereinabove is achieved by the wedge-shaped cross-sectional configuration of the plate 18 as illustrated in FIG. 4.

In the exemplary embodiment, with the relatively fixed comb system holding the waveguides in the appropriate centering grooves, appropriate adhesive can now be introduced into the centering grooves of the connector so that the finished end piece can be removed after drying of the adhesive. The hardening of the adhesive can be accelerated when, for example, heating means 33 is provided in a bearing block 34. Given an exemplary embodiment of the invention having a removable and interchangeable plate 30, the heating means 33 is respectfully provided with terminal sockets to which the corresponding electrical connections can be applied. Given such an embodiment, the adhesive is expediently not applied or cure until after the interchangeable plate 30 has been removed. This provides the advantage that the contamination of the comb systems such as 21 and 23 with the adhesive residues will not occur. In an expedient fashion, after removal from the assembly 11, the guide bores 37 and 42 of the plate 30 are now applied to the guide pins of the appliance plate 101. In addition, a connection of the heating elements in the bearing block 32 is produced when the sockets for the heating element receive the electrical terminal pins 9. A magnet such as 43 is positioned in the receptacle plate 30 for the purpose of facilitating a reliable position of tne plate 30 on the plate 101. It is also noted that the plate 30 is provided with a support bench or member 41 for supporting the introduced light waveguides when the interchangeable plate 30 is removed from the assembly of appliance 11 so that the dislocation of light waveguides as a result of friction at the lamellaees of the comb systems is suppressed.

It should be noted that while assembling the waveguides in the grooves of the connector element, the clamping device formed by the elements 31, 34, 39 and 40 is open. After the waveguides are in the centering grooves, a covering or cover element can be applied and is held by the pressure member 34 which acts on the cover when the bracket 31 has its hook received in the slot or recess 109. As noted, the pressure member 34 is resiliently urged into contact by means of a leaf-spring 38 on the member 39. By providing a plurality of interchangeable plates 30, six in the present instance, it is possible after removing the first receptacle and placing it on the guide pin 10 with the heating element being connected to the terminal pins 9 that a next plate can be applied on the assembly 11 to enable another assembly operation between a connector and a bundle of waveguides. While this is happening, heating by the heating element 33 can facilitate curing of the adhesive. If desirable, a timing switch can be present in the plate to automatically connect the terminal pins 9 to a source of electrical energy after the plate 30 has been assembled thereon.

As illustrated in FIG. 1, two assembly appliances 11 as well as two lacquer stripping devices 12, are provided on the plate 101. As noted hereinabove, two comb systems are provided on each of the appliances 11, the one comb system 23 for positioning the stripped light waveguides and one comb system 21 for positioning the coated light waveguides. The individual lamellae or plates 28 of the second comb system 21 can also be provided with individual markings, for example, each plate can be provided with a color which is in agreement with the color code of a light waveguide which is to be received. Thus, the insertion of the light waveguides will always be in a given order and this enables producing multiple connectors with the same systematic sequence.

The interchangeable plates 30 thus essentially comprise only the less sensitive locating parts whereas the assembled appliances 11 first and foremost contain the precision parts in the form of the comb systems. The interchangeable plates 30 then also contain the clamping device for the multiple connector as well as the electrical heating element which is integrated in the bearing block 32 and can be brought to a temperature of 100° C. given a heating time of approximately two minutes. The parts forming the third means are essentially designed in the form of quick-release closure. After transfer of the interchangeable plate 30 into the curing positions, the heating element is automatically switched on as said plate 30 is deposited and a light-emitting diode indicates when the curing process has been concluded.

After the curing process, the end faces of the multiple connectors are ground and polished with the assistance of manual grinding means which can be stored within the casing of the device. The multiple connectors consisting, for example, of silicon, are clamped in the manual grinding means so that the end faces of the part are guided across the corresponding grinding disk with a minimum angular error. The production of multiple connectors has thus been concluded and the cable equipped with the end piece can then be introduced into a connection unit. Since it is essentially only a matter of aligning the centering grooves of the multiple connector with the individual slots of the comb system, the principles of the assembly device can be employed regardless of the further shape of the multiple connector. Particularly suited therefore, however, are multiple connectors of silicon in which the centering grooves are etched.

The finished connecting element in the form of multiple connectors can be accommodated as needed in a splice bed which is mounted on the plate 101 at a receptacle 8.

Although various minor modifications may be suggested by those versed in the art, it should be understood that I wish to embody within the scope of the patent granted hereon, all such modifications as reasonably and properly come within the scope of my contribution to the art.

I claim:

1. In an apparatus for facilitating assembly of a plurality of waveguides to a connector for said plurality of waveguides, said apparatus including a first part having means for positioning the stripped ends of individual waveguides, a second part having a second means for positioning each of the light waveguides which are cladded with a protective layer, and a third part having third means for fixing the position of all of the waveguides to be connected, the improvements comprising the first means being a first comb system having a plurality of first teeth members with spaces therebetween, said second means being a second comb system with a plurality of second teeth members with spaces therebetween, the spaces between the first teeth members of the first comb system being matched to the diameter of the stripped waveguide, the spaces between the second teeth members of the second comb system being matched to the diameter of the cladded waveguide, a carrier on which said first and second comb systems are mounted with said spaces of the second comb system aligned to the spaces of the first comb system, said means for locating including means for supporting a connector element with centering grooves for multiple waveguides between said first and second comb systems with the centering grooves of the connector element being aligned with the spaces of the first and second comb system and also including clamping means for holding a covering element on the connector element with the waveguides being positioned in the centering grooves and said third means including a universally shared receptacle for all of the light waveguides, a frame adapted for attachment to said carrier on which said locating means and said third means are mounted, and means for fixing the position of said frame on said carrier for accurately positioning at least said means for locating with respect to said first and second comb systems.

2. In an apparatus according to claim 1, wherein the teeth member of the first and second comb systems are formed by planar lamellae.

3. In an apparatus according to claim 2, wherein the planar lamellae of the first comb system are formed by lamellae of equal height.

4. In an apparatus according to claim 2, wherein the planar lamellae of the second comb system are formed by a lamellae of different heights which are arranged with one another according to increasing height to form a stairstep configuration.

5. In an apparatus according to claim 1, wherein said comb systems are disposed on a surface of said carrier plate inclined from adjacent the operator toward the back.

6. In an apparatus according to claim 1, wherein each of the comb systems have the teeth member formed by planar lamellae carrying different markings.

7. In an apparatus according to claim 6, wherein the lamellae exhibit different colorations as markings.

8. In an apparatus according to claim 1, wherein said means for supporting includes a bearing block for the multiple connector rigidly disposed between the first and second comb system.

9. In an apparatus according to claim 1, wherein the third means include a support member having a recess coacting with a clamping element.

10. In an apparatus according to claim 9, wherein the support element is displaceable in a longitudinal direction.

11. In an apparatus according to claim 9, wherein the support element of the third means is mounted to be rotated around an axis.

12. In an apparatus according to claim 1, which includes means for stripping lacquer from the waveguides.

13. In an apparatus according to claim 12, wherein the means for stripping lacquer include a container of a solution selected from a group consisting of chemical solvents and swelling agents.

14. In an apparatus according to claim 12, wherein the means for stripping lacquer include a container containing an agent acting on the lacquer, said container being provided with a cover having bores extending therethrough, said bores having a diameter corresponding to the diameter of the coated light waveguides and being provided with funnel-like entrance portions to facilitate inserting the waveguides therein.

15. In an apparatus according to claim 1, wherein the means for supporting the connector include a bearing block having means for heating a connector disposed on the bearing block.

16. In an apparatus according to claim 1, wherein the means for supporting the connector include a bearing block having a slot for guiding the connector thereon.

17. In an apparatus according to claim 16, wherein the clamping means include a resilient pressure element.

18. In an apparatus according to claim 1, wherein said means for positioning said frame on said carrier includes guide pins on said carrier and guide bores in said frame for receiving said guide pins.

19. In an apparatus according to claim 1, wherein the bearing block includes heating means having electrical terminals.

20. In an apparatus according to claim 18, wherein said frame has cutout portions to enable the comb systems to extend therethrough.

21. In an apparatus according to claim 20, wherein the frame contains a magnet.

22. In an apparatus according to claim 20, wherein the frame includes a support bench positioned between the receptacle of the third means and the cutout portion for the second comb system.

23. In an apparatus according to claim 1, further comprising an appliance plate and wherein a second carrier having additional first and second comb systems is disposed adjacent the first-mentioned carrier on said appliance plate.

24. In an apparatus according to claim 23, further comprising a frame for each carrier and wherein the appliance plate is provided with a plurality of spaced electrical terminals arranged in pairs and where each of the bearing blocks of each frame has a means for heating including a pair of electrical terminals coacting with the terminals of the appliance plate to energize the means for heating.

25. In an apparatus according to claim 24, wherein each of the heating means include an automatic timing switch.

26. In an apparatus according to claim 23, wherein the appliance plate includes a mount for a splice bed.

27. In an apparatus according to claim 23, wherein the appliance plate includes an electrical power system including internal batteries, means for connecting batteries, and means for connecting outside power lines, said appliance plate also including switches and monitoring units for the power system.

28. In an apparatus according to claim 23, wherein the appliance plate comprises a cover hinged to a case.

29. In an apparatus according to claim 28, wherein the case includes storage area for tools necessary to complete the formation of the connection.

* * * * *